(12) United States Patent
Chung et al.

(10) Patent No.: US 8,572,600 B2
(45) Date of Patent: Oct. 29, 2013

(54) METHOD FOR UPDATING FIRMWARE OF SENSOR NODES ON THE WIRELESS SENSOR NETWORK

(75) Inventors: Tae-Yun Chung, Gangneung-si (KR); Hyung-Bong Lee, Seoul (KR); Dae-iL Kim, Gangneung-si (KR)

(73) Assignee: Gangneung-Wonju National University Industrial Academy Cooperation Group (KR)

( * ) Notice: Subject to any disclaimer, the term of this patent is extended or adjusted under 35 U.S.C. 154(b) by 948 days.

(21) Appl. No.: 12/670,314

(22) PCT Filed: Jun. 23, 2008

(86) PCT No.: PCT/KR2008/003551
§ 371 (c)(1),
(2), (4) Date: Jan. 22, 2010

(87) PCT Pub. No.: WO2009/014319
PCT Pub. Date: Jan. 29, 2009

(65) Prior Publication Data
US 2010/0205596 A1    Aug. 12, 2010

(30) Foreign Application Priority Data

Jul. 26, 2007  (KR) .................. 10-2007-0075207
Aug. 23, 2007  (KR) .................. 10-2007-0084768

(51) Int. Cl.
*G06F 9/22* (2006.01)
*G06F 11/00* (2006.01)
(52) U.S. Cl.
USPC ........... 717/172; 717/168; 717/169; 717/170; 717/171; 717/173; 714/2; 714/15; 714/20
(58) Field of Classification Search
None
See application file for complete search history.

(56) References Cited

U.S. PATENT DOCUMENTS 6,961,595 B2 * 11/2005 Laroia et al. .................. 455/574
7,315,898 B2 *  1/2008 Kohno .......................... 709/230
(Continued)

FOREIGN PATENT DOCUMENTS

| KR | 10-2005-0106644 | 11/2005 |
|---|---|---|
| KR | 10-2007-0000738 | 1/2007 |
| KR | 10-2007-0038810 | 4/2007 |

OTHER PUBLICATIONS

"A new model for updating software in wireless sensor networks (2006)" by Stephen Brown and Cormac J. Sreenan; IEEE Network Nov./Dec. 2006.*

(Continued)

*Primary Examiner* — Henry Tsai
*Assistant Examiner* — Jing-Yih Shyu
(74) *Attorney, Agent, or Firm* — Cantor Colburn LLP

(57) ABSTRACT

A method for updating firmware of a plurality of nodes constituting a wireless sensor network is disclosed. The wireless sensor network includes a server, a gateway and the plurality of nodes. The firmware to be updated is transmitted from the server through the gateway to an uppermost node. The firmware is sequentially transmitted to the plurality of nodes from the uppermost node to a lowermost node using wireless communication, and the respective nodes, which have received the firmware, record the firmware in their own memory. When the recording of the firmware is completed in all the nodes, boot programs of the respective nodes are run and the firmware, stored in the memory, is recorded in program memory, the firmware recorded in the nodes are executed, and the nodes constitute a new network while communicating with the peripheral nodes thereof.

2 Claims, 7 Drawing Sheets

(56) References Cited

U.S. PATENT DOCUMENTS

| | | | |
|---|---|---|---|
| 7,516,450 B2* | 4/2009 | Ogura | 717/168 |
| 7,924,150 B2* | 4/2011 | Baldus et al. | 340/539.12 |
| 7,983,685 B2* | 7/2011 | Silverstrim et al. | 455/447 |
| 8,107,397 B1* | 1/2012 | Bagchi et al. | 370/254 |
| 8,331,282 B2* | 12/2012 | Pandey et al. | 370/322 |
| 8,351,369 B2* | 1/2013 | Han et al. | 370/322 |
| 2002/0152387 A1* | 10/2002 | Asano | 713/176 |
| 2005/0028001 A1* | 2/2005 | Huang et al. | 713/200 |
| 2005/0169481 A1* | 8/2005 | Han et al. | 380/277 |
| 2006/0031426 A1* | 2/2006 | Mesarina et al. | 709/220 |
| 2006/0161909 A1* | 7/2006 | Pandey et al. | 717/168 |
| 2007/0274521 A1* | 11/2007 | Asano | 380/202 |
| 2007/0287396 A1* | 12/2007 | Huang et al. | 455/185.1 |
| 2008/0137624 A1* | 6/2008 | Silverstrim et al. | 370/338 |
| 2009/0062626 A1* | 3/2009 | Baldus et al. | 600/301 |

OTHER PUBLICATIONS

"Efficient Code Distribution in Wireless Sensor Networks" by Niels Reijers and Koen Langendoen; WSNA'03, Sep. 19, 2003, San Diego, California, USA.*

"Incremental Network Programming for Wireless Networks" by Jaein Jeong and David Culler; 2004 IEEE.*

"Providing reliable OS support to wireless sensor networks" by Lin Gu and John A. Stankovic; University of Virginia.*

"State of the Art in Security of Wireless Sensor Networks" by Roberto Di Pietro, Yee Wei Law, Sandro Etalle, Pieter H. Hartel, Paul Havinga; Sep. 4, 2002.*

"A Remote Code Update Mechanism for Wireless Sensor Networks (2003)" by Thanos Stathopoulos, John Heidemann, Deborah Estrin; CENS Technical Report #30, Dept. Comp. Sci., UCLA, Nov. 2003.*

J. W. Hui and D. Culler. The dynamic behavior of a data dissemination protocol for network programming at scale. In 2nd Int. Conf. on Embedded Networked Sensor Systems (SenSys'04), pp. 81-94, Nov. 2004.*

"Dynamic Software Update of Resource-Constrained Distributed Embedded Systems" by Meik Felser, Rudiger Kapitza, Jurgen Kleinoder, Wolfgang Schroder-Preikschat.*

International Search Report-PCT/KR2008/003551 dated Dec. 4, 2008.

* cited by examiner

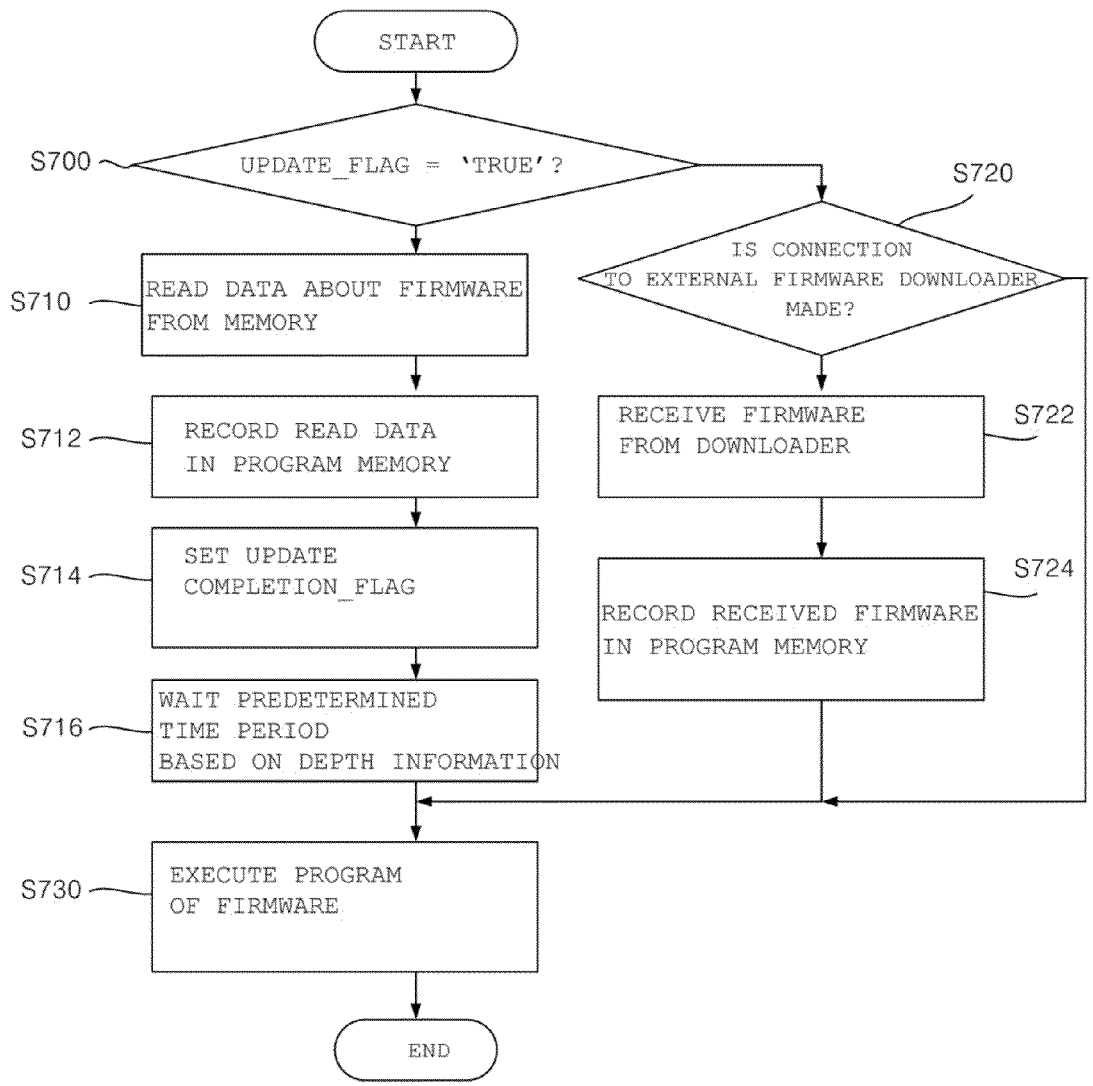

METHOD FOR UPDATING FIRMWARE OF SENSOR NODES ON THE WIRELESS SENSOR NETWORK

TECHNICAL FIELD

The present invention relates, in general, to a method for updating the firmware of a plurality of nodes in a wireless sensor network, and, more particularly, to a method of updating the firmware of a plurality of sensor nodes without performing a process of collecting or reinstalling the sensor nodes.

BACKGROUND ART

Generally, a Ubiquitous Sensor Network (USN) means a network system which processes and manages information by constituting a wireless sensor network using a plurality of sensor nodes each including a sensor capable of detecting information about recognition of objects or information about peripheral environments, and by connecting information, input through various sensors, to the outside in real time over a network. The USN ultimately provides all objects with computing and communication functions, thereby aiming at realizing an environment in which communication can be performed regardless of the type of network, device, or service, anytime and anywhere.

The general construction of the USN includes a plurality of sensor nodes, each of which is configured to include a communication module and a sensor for detecting information about recognition of objects or information about peripheral environments, sensor fields, each of which is provided with a set of sensor nodes, a sink node, which is configured to receive information collected from the sensor fields, and a gateway, which is configured to route information received from the sink node and then transmit the routed information to a management server over a broadband network. In this configuration, the sink node can be connected to the gateway using an existing infrastructure such as satellite communication, a wireless Local Area Network (LAN), Bluetooth, and the wired Internet. The USN can be used to detect the fact that a disaster has occurred and manage the disaster when a disaster, such as a fire, a flood, or an earthquake, occurs.

However, in the case in which the functions of a wireless sensor network are added or maintained, trouble must be taken to collect the plurality of sensor nodes in order to update firmware installed in the respective sensor nodes, which are distributedly installed at respective sites. Further, after the sensor nodes, which are actually scattered in a wide area, are collected and then updated, the sensor nodes must be installed in their original locations again, so that a problem occurs in that large amounts of time and money for collecting and reinstalling the sensor nodes are required.

DISCLOSURE

Technical Problem

Accordingly, the present invention has been made keeping in mind the above problems occurring in the prior art, and an object of the present invention is to provide a method of conveniently updating the firmware of sensors without performing a process of collecting sensors installed over a wireless sensor network.

Technical Solution

In order to accomplish the above object, the present invention provides a method for updating firmware of a plurality of nodes constituting a wireless sensor network, including a server, a gateway and the plurality of nodes, the method including transmitting firmware to be updated from the server through the gateway to an uppermost node; sequentially transmitting the firmware to the plurality of nodes from the uppermost node to a lowermost node using wireless communication, and the respective nodes, which have received the firmware, recording the firmware in their own memory; and when the recording of the firmware is completed in all the nodes, running the boot programs of the respective nodes and recording the firmware, stored in the memory, in program memory, executing the firmware recorded in the nodes, and the nodes constituting a new network while communicating with peripheral nodes.

In the update method having the above-described characteristics, the server acquires and stores the depth information of the lowermost node before transmitting the firmware to be updated, acquires the depth information of a lowermost node of a network newly constructed after the update of the firmware is completed in all the nodes, compares the depth information of the lowermost node, which is acquired before the update, with the depth information of the lowermost node, which is acquired after the update, and verifies that the update is completed if the depth information, which is acquired before the update, is identical to the depth information, which is obtained after the update.

In the update method having the above-described characteristics, each of the nodes which constitutes the wireless sensor network has a transmission interval, a reception interval and a sleeping interval so as to transmit and receive data; and an upper node transmits a data packet, providing notification of transmission of the firmware, during the transmission interval thereof, and a lower node receives the firmware from the upper node during the sleeping interval thereof when the data packet, providing notification of transmission of the firmware, is received from the upper node during the reception interval of the lower node.

In the update method having the above-described characteristics, each of the boot programs boots each of the nodes by sequentially performing: (a) if an update_flag is set to 'True', reading firmware previously stored in the memory and recording it in the program memory; (b) if the update_flag is not set to 'True' and connection to an external firmware downloader is made, receiving firmware from the firmware downloader, and recording the received firmware in the program memory; and (c) executing the application program of the firmware recorded in the program memory.

Advantageous Effects

According to the present invention, firmware can be replaced without collecting a plurality of nodes installed in a wireless sensor network. Further, according to the present invention, the firmware of each of the nodes can be easily and rapidly replaced by wirelessly transmitting/receiving data, so that the addition and maintenance of functions are easy.

DESCRIPTION OF DRAWINGS

FIG. 7 is a flowchart sequentially showing the operation of the boot programs of each of the nodes in the update method according to the preferred embodiment of the present invention.

BEST MODE

Hereinafter, a method for updating the firmware of a plurality of nodes in a wireless sensor network according to a preferred embodiment of the present invention will be described in detail with reference to the attached drawings.

Figure 1:
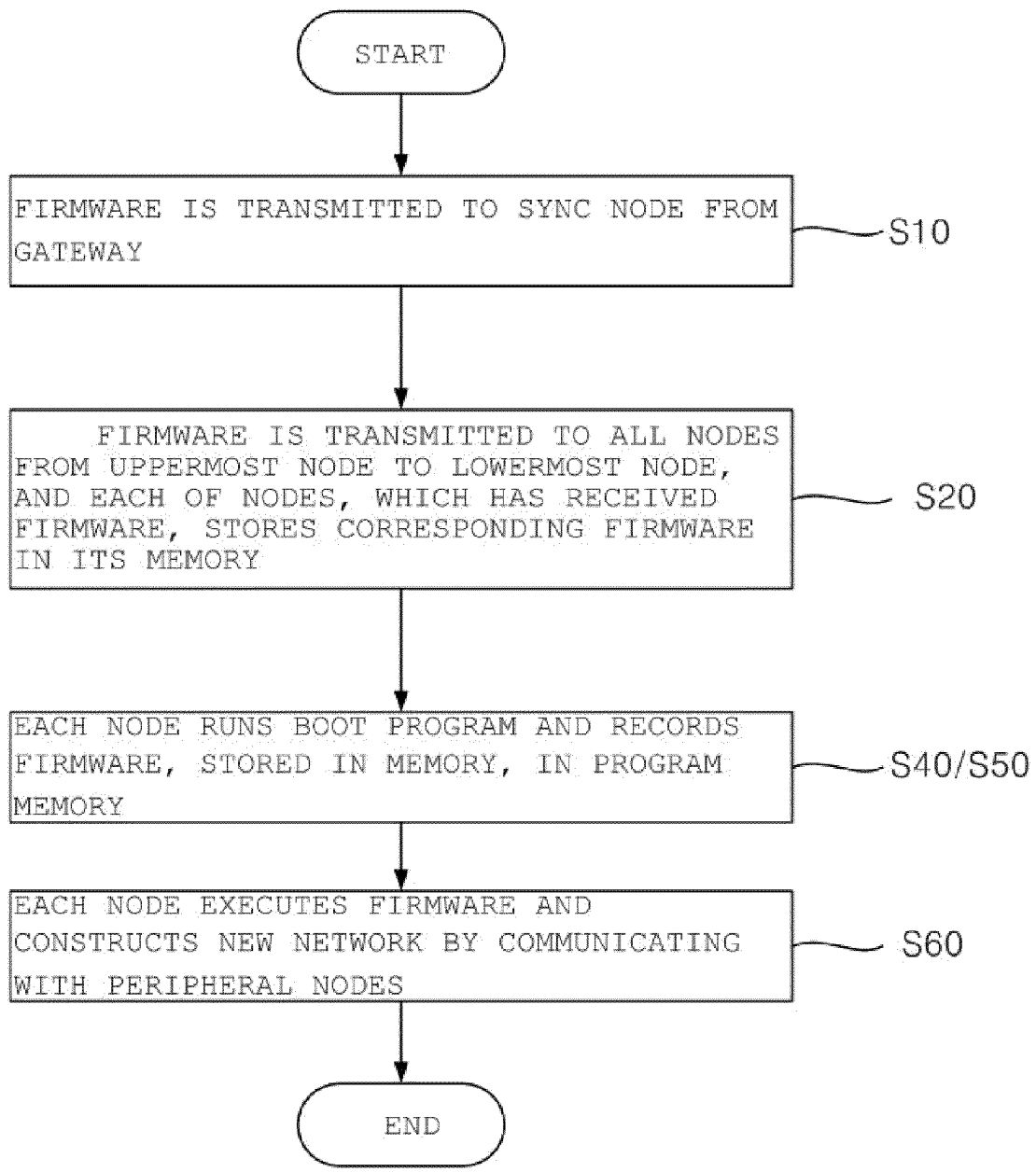
FIG. 1 is a flowchart showing a method of updating the firmware of nodes according to a preferred embodiment of the present invention.

FIG. 1 is a flowchart totally showing a method of updating the firmware of a plurality of nodes according to a preferred embodiment of the present invention.

Referring to FIG. 1, first, a gateway transmits firmware to be updated to a sink node through RS232C at step 10. Next, the firmware is sequentially transmitted to a plurality of nodes, that is, from the sink node to a terminal node using wireless communication at step 20. Here, the respective nodes, which have received the firmware from each of their upper nodes, record the corresponding firmware in their memory. Next, when the recording of the firmware in the memory of all of the nodes is completed, the respective nodes perform reboot and then run the boot programs thereof at step 40. Here, after the boot program of each of the nodes records the firmware, stored in the memory through the above-described process, in program memory at step 50, the boot program executes the recorded firmware at step 60. Due to the execution of the updated firmware, each node constitutes a new network by communicating with the peripheral nodes thereof again, so that the node completes the update of the firmware.

Based on the update method according to the present invention having the above-described configuration, firmware installed in a plurality of nodes can be replaced without a user performing a process of collecting and reinstalling the plurality of nodes which has been already installed, and the firmware can be easily and rapidly replaced, so that the addition and maintenance of functions become easy.

Hereinafter, the above-described respective steps will be described in further detail. In this specification, the term "CP" means a Command Packet, the term "DP" means a Data Packet, the term "PDU" means a Protocol Data Unit, the term "NPDU" means a Network layer Protocol Data Unit, the term "APDU" means an Application layer Protocol Data Unit, the size of a receivable packet means the length of actual data to be loaded in a packet, and the number of receivable packets means the number of packets that are successively transmitted and received.

Figure 2:
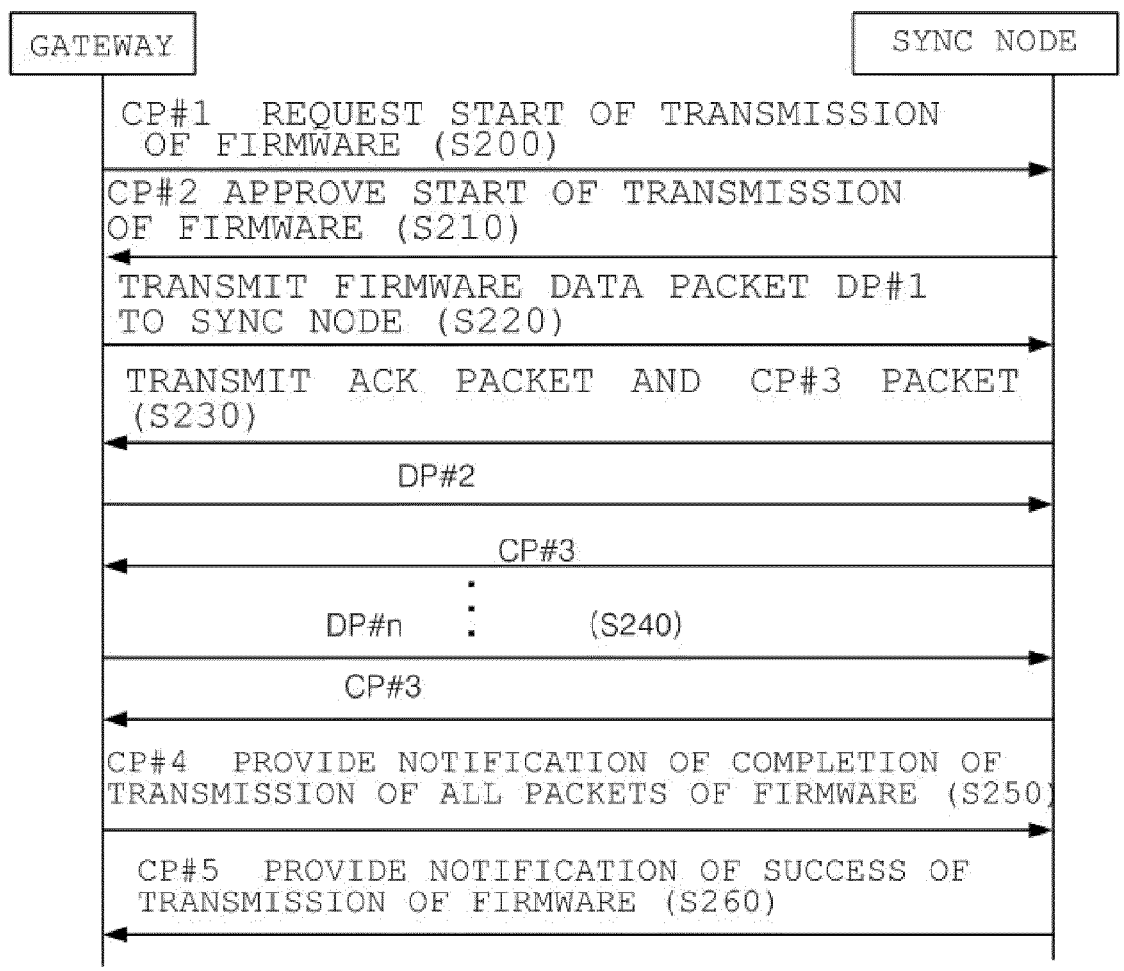
FIG. 2 is a flowchart showing a process of transmitting firmware between a gateway and a sink node in an update method according to a preferred embodiment of the present invention.

Hereinafter, in the update method according to a preferred embodiment of the present invention, the process of transmitting firmware between a gateway and a sink node will be described in detail. FIG. 2 is a flowchart showing the process of transmitting firmware between a gateway and a sink node in the update method according to the present invention.

Referring to FIG. 2, first, a gateway transmits a CP#1, requesting the start of transmission of firmware, to the sink node at step 200. The CP#1 includes information about firmware size. Next, when the sink node receives the CP#1, the sink node transmits a CP#2, approving the start of transmission, to the gateway at step 210. Thereafter, when the gateway receives the CP#2, the gateway transmits a firmware data packet DP#n to the sink node at step 220. The DP#n is one packet obtained by dividing the firmware into n parts. Next, when the sink node receives the DP#n, the sink node transmits a CP#3, which is an ACK packet for the DP#n, to the gateway at step 230. The CP#3 includes 'n' information about the received firmware packet. The steps 220 and 230 are repeated until all of the firmware packets DP#1 to DP#n are transmitted at step 240. Thereafter, the gateway transmits a CP#4 providing notification that all of the firmware packets have been transmitted to the sink node at step 250. The sink node compares information about the total size of the firmware, included in the CP#1, with information about the total size of the received firmware packets DP#1 to DP#n, and then transmits a CP#5 providing notification of whether the transmission is successful to the gateway at step 260.

If, based on the content of the CP#5, the transmission fails, the above-described process is performed again.

Figure 3:
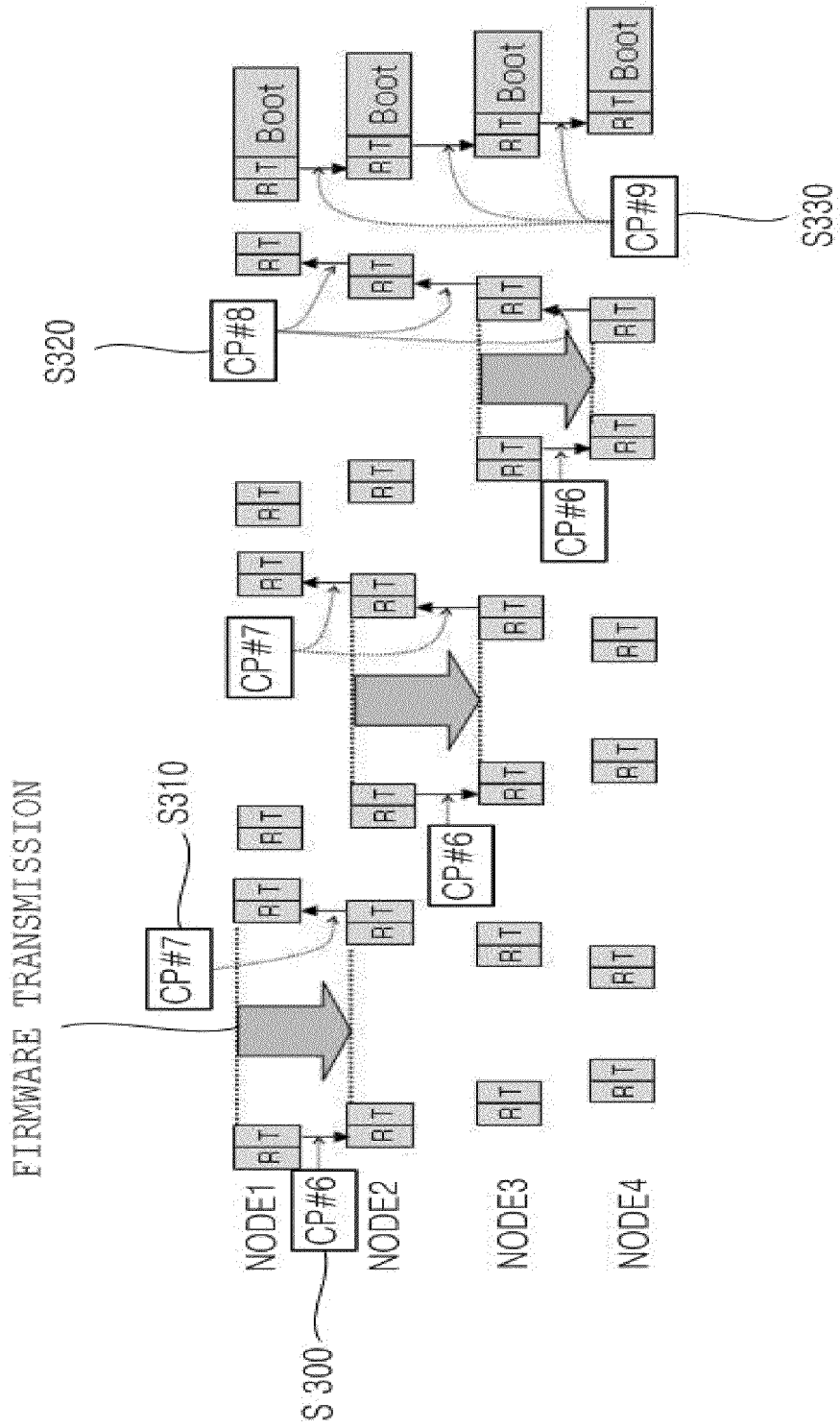
FIG. 3 is a flowchart showing a process of transmitting firmware to respective nodes in the update method according to the preferred embodiment of the present invention.
Figure 4:
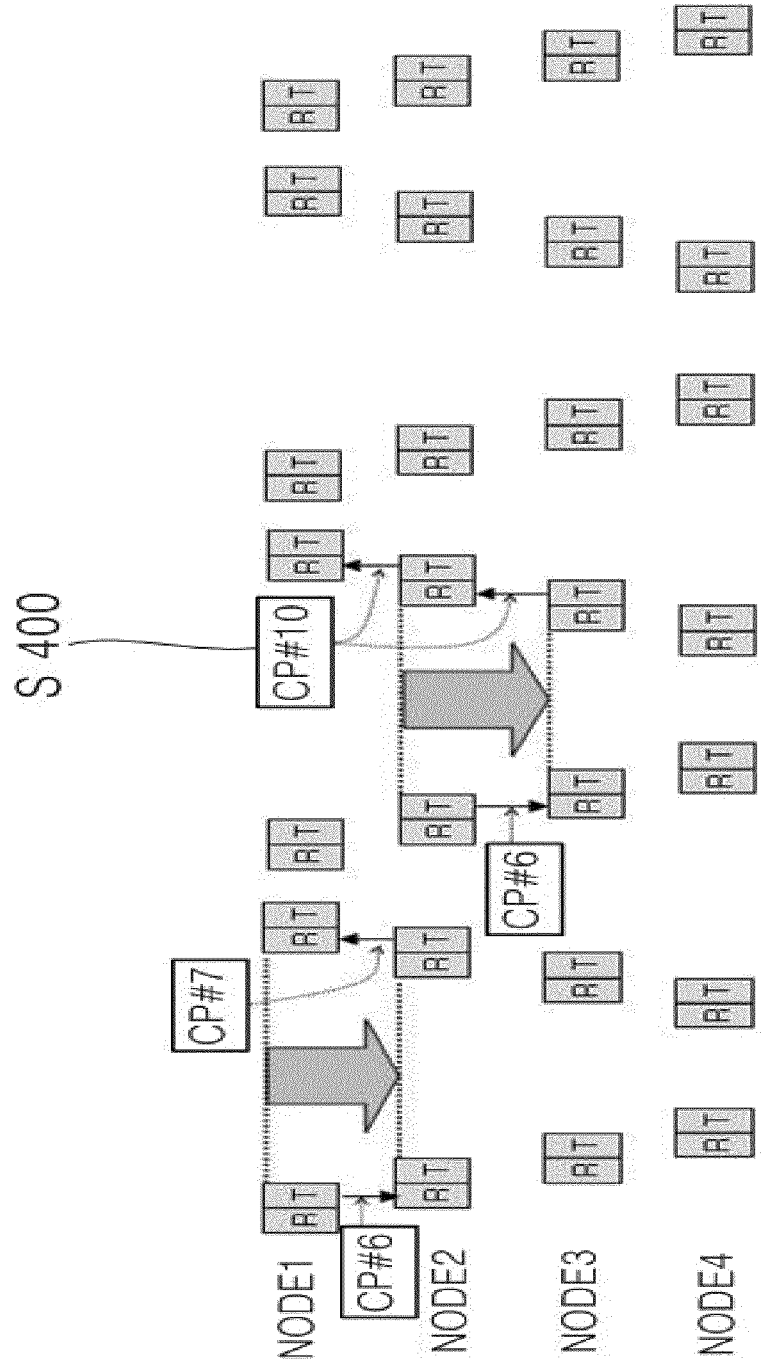
FIG. 4 is a flowchart showing a transmission process in the case in which firmware transmission fails.

Hereinafter, in the update method according to the preferred embodiment of the present invention, a process of transmitting firmware to a plurality of nodes in a Time Division Multiple Access (TDMA) linear network will be described in detail. FIG. 3 is a flowchart showing a process of transmitting firmware to each of the nodes in the update method according to the present invention. FIG. 4 is a flowchart showing a transmission process in the case in which firmware transmission fails. In the TDMA linear network, to which the update method according to the present invention is applied, a plurality of sensor nodes is linearly connected to each other. The sink node, which is the uppermost node, transmits/receives data to/from the gateway, and a plurality of nodes is linearly connected between the sink node and the terminal node, which is the lowermost node. Further, each of the nodes repeatedly includes a transmission interval for transmitting data, a reception interval for receiving data, and a sleeping interval for sleeping without transmitting data.

Referring to FIG. 3, first, an upper node transmits a CP#6 to a lower node so as to provide notification that firmware will be transmitted during a sleeping interval at step 300. Next, the lower node, which has received the CP#6, does not enter a sleeping state so as to receive firmware during the sleeping interval. Thereafter, when the reception of the firmware from the upper node to the lower node is successful during the sleeping interval, the lower node transmits a CP#7 to a sink node, which is the uppermost node, at step 310. The CP#7 includes information about the unique ID and network depth of the lower node, and the CP#7 is transmitted to a server, thereby informing a manager of information about the details of transmission of the current firmware.

If the lower node fails to receive the firmware from the upper node during the sleeping interval, the lower node transmits a CP#10 to the uppermost node (sink node, refer to FIG. 4), at step 400 in FIG. 4. The CP#10 includes information about the unique ID and network depth of the lower node. If one or more upper nodes, which have received the firmware, receive the CP#10, a firmware transmission completion state is released. The CP#10 is transmitted to the server, thereby informing a manager of the failure of the transmission of the current firmware.

Thereafter, when the firmware is transmitted to the lowermost node, the lowermost node transmits a CP#8 to the uppermost node (sink node), thereby providing notification that the transmission of the firmware to all of the nodes of the network has been completed, at step 320. The CP#8 is transmitted to the server, thereby informing a manager that the transmission of the firmware to all of the nodes in the network has been completed, at step 330.

The uppermost node (sink node), which has received the CP#8, transmits a CP#9, requesting reboot, to the lower nodes.

Each of the nodes, upon receiving the CP#9, executes a boot program and executes firmware which is replaced after updating existing firmware, thereby constituting a new network.

Figure 5:
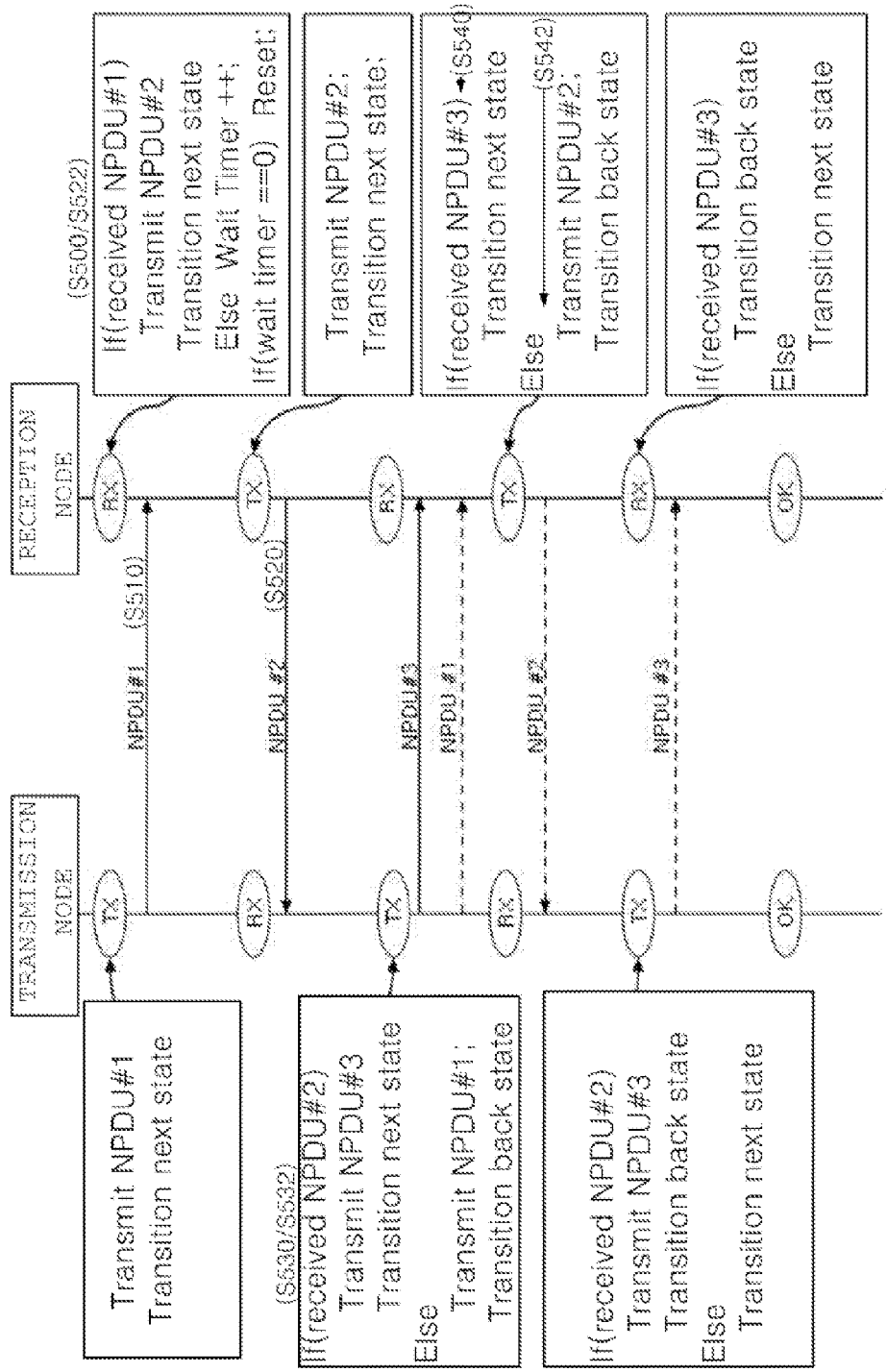
FIG. 5 is a flowchart sequentially showing a process of a transmission node making an attempt to access a reception node and then performing synchronization according to a preferred embodiment of the present invention.

Hereinafter, in the update method according to the present invention, a process of a transmission node making an attempt to access a reception node and then performing synchronization will be described in detail. FIG. 5 is a flowchart sequentially showing a process of a transmission node making an attempt to access a reception node and then performing synchronization according to the present invention.

Referring to FIG. 5, first, a reception node operates the wait timer of a transmission node, and waits for access at step 500. The transmission node operates the wait timer so as to make an attempt to access the reception node and transmits an NPDU#1 at step 510. Here, the NPDU#1 includes data size. When the reception node receives the NPDU#1, the reception node transmits an NPDU#2, including the size of a receivable packet and the number of receivable packets, which are taken as defaults, to the transmission node at step 520. When the reception node cannot receive the NPDU#1 and the wait timer is terminated, the reception node is reset at step 522.

When the transmission node receives the NPDU#2, the transmission node sets the size of a receivable packet and the number of receivable packets, transmits an NPDU#3 to the reception node, and then operates the wait timer at step 530. If the transmission node cannot receive the NPDU#2, the transmission node transmits the NPDU#1 again. Here, in the case in which the wait timer is terminated, the transmission node abandons a synchronization step and is then reset at step 532.

Thereafter, when the reception node receives the NPDU#3, the wait timer is terminated and the synchronization step is terminated at step 540. When the reception node cannot receive the NPDU#3, the reception unit transmits the NPDU#2 again and then waits for the NPDU#3 at step 542. Here, in the case in which the wait timer is terminated, the reception unit abandons the synchronization step and is then reset.

Next, when the transmission node receives the NPDU#2, the steps 530 and 532 are performed again. Otherwise, the wait timer is terminated and then the synchronization step is terminated.

Figure 6:
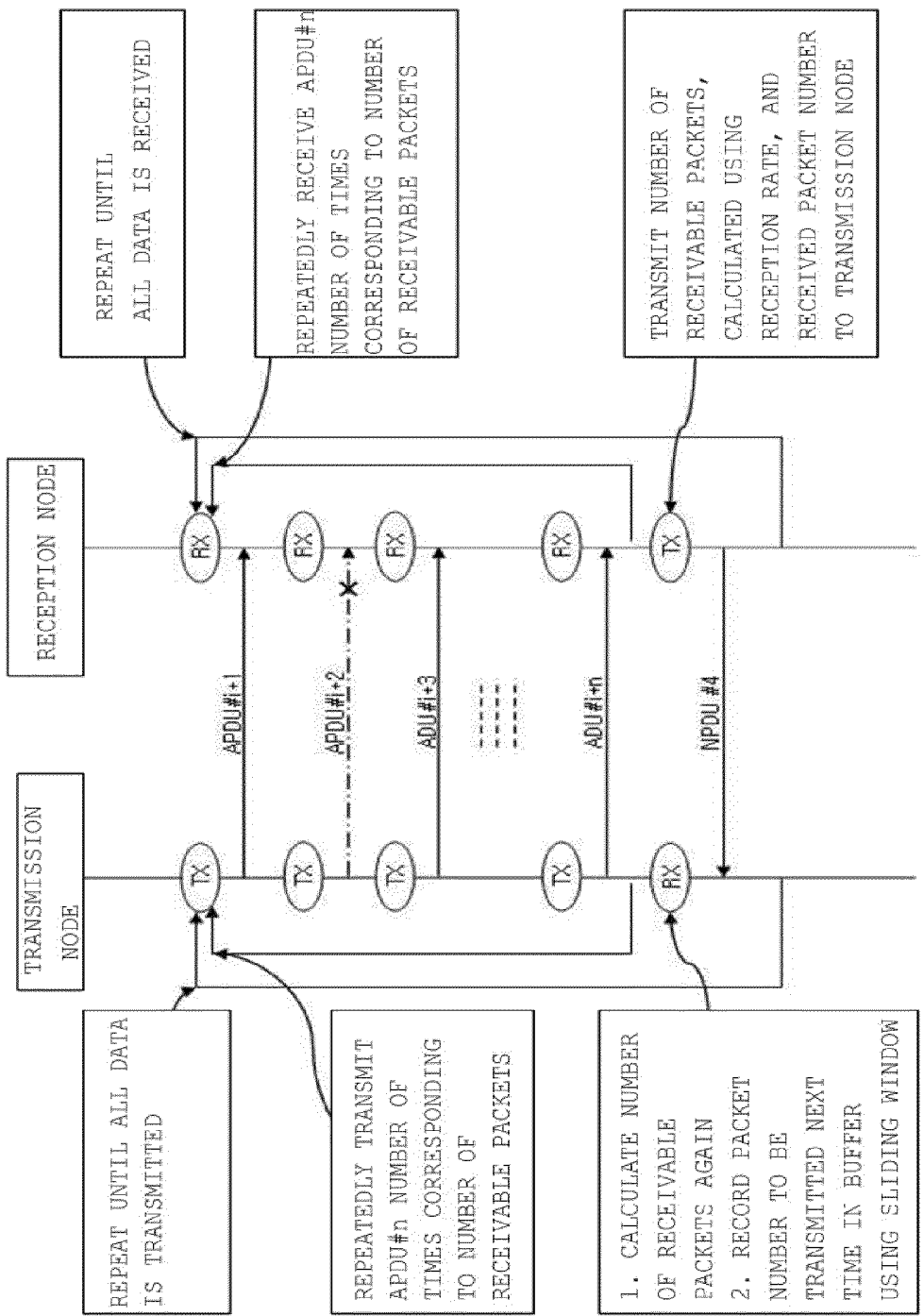
FIG. 6 is a flowchart sequentially showing a process of transmitting data between the transmission node and the reception node, which are synchronized with each other, according to a preferred embodiment of the present invention.

Hereinafter, in the update method according to the present invention, a process of the transmission node and the reception node transmitting and receiving data in the state in which the transmission node and the reception node are synchronized with each other will be described in detail. FIG. 6 is a flowchart sequentially showing the process of the transmission node and the reception node, which are synchronized with each other, transmitting data according to the present invention.

Referring to FIG. 6, when the above-described synchronization step is terminated, the transmission node and the reception node are synchronized with each other. Therefore, the process proceeds in the state in which a TX interval and an RX interval are coupled with each other. Here, setting is made such that Timer_Count=5. First, the transmission node transmits an APDU#n while repeating the TX interval a number of times corresponding to the number of receivable packets. The APDU includes a packet number and actual data, and the size of the actual data is identical to the size of a receivable packet. Thereafter, the reception node receives the APDU#n while repeating the RX interval a number of times corresponding to the number of receivable packets. Thereafter, when the TX intervals of the transmission node are terminated, the state changes to an RX interval, and the transmission node waits for a response from the reception node. Thereafter, when the RX interval is terminated, the reception node transmits an NPDU#4 to the transmission node. The NPDU#4 includes a received packet number and the number of receivable packets, calculated based on the transmission rate. If the reception node fails to receive the APDU#n, Timer_Count decreases by 1. When Timer_Count is 0, the reception node abandons the reception of data and is then reset. Thereafter, when the transmission node receives the NPDU#4, the transmission node records a packet number to be transmitted next, and then sets the number of receivable packets. If the transmission node fails to receive the NPDU#4, Timer_Count decreases by 1. When Timer_Count is 0, the transmission node abandons the transmission of data and is then reset. Thereafter, the above-described steps are repeated until all data are transmitted.

Hereinafter, in the update method according to the present invention, the operation of the boot program of each of the nodes which constitutes a wireless sensor network will be described in detail. FIG. 7 is a flowchart sequentially showing the operation of the boot program.

Referring to FIG. 7, when the power of a node is turned on, a boot program is executed. First, an update_flag is checked at step 700. When the update_flag is set to 'True', a firmware update step is performed, and when the update_flag is not set to 'True', a general boot step is performed.

The firmware update step includes the following process. First, data about firmware is read from memory, in which new firmware is recorded, at step 710, and then the data is recorded in program memory at step 712. When the firmware is completely recorded in the program memory, an update completion flag is set up at step 714, the node waits a predetermined time based on depth information, which is the network location information of the node itself, at step 716, and then executes the program of the newly updated firmware at step 730.

The general boot step includes the following process. First, it is determined whether connection to an external firmware downloader, such as a computer, has been made at step 720. If connection to the downloader has been made, firmware is received from the downloader at step 722 and the received firmware is recorded in program memory at step 724, and then a corresponding program is executed when the firmware is completely recorded at step 730. If connection to the downloader has not been made, an existing program recorded in the program memory is executed at step 730.

Hereinafter, in the update method according to the present invention, a process of the server of a wireless sensor network determining the time point at which each node completes the update of firmware will be described in detail.

First, the lowermost node of a network transmits its depth information to the server at predetermined time intervals. The server receives the depth information of the lowermost node and recognizes the number of nodes in the current network. Meanwhile, before the server performs update for the firmware of the respective nodes, the server records the newest depth information and then transmits the firmware.

When update is performed using new firmware, the nodes, which constitute a network by executing the updated firmware, transmit their depth information to the server. The server compares depth information, which is obtained before the firmware is transmitted, with the depth information of the node, which is obtained after the firmware is transmitted, in the network which is newly constituted. If the depth information, which is obtained before update is performed, is identical with the depth information, which is obtained after the update is performed, it is determined that the number of network nodes, obtained before the update is performed, is identical to the number of nodes, obtained after the update is performed, thereby verifying that the construction of the network using the new firmware is completed.

Although the present invention has been described based on the preferred embodiments of the present invention, the preferred embodiments are disclosed for illustrative purposes, and the present invention is not limited thereto. Those skilled in the art will appreciate that various modifications and applications which have not been described in connection with the preferred embodiment are possible without departing from the essential characteristics of the invention. Further, it should be interpreted that differences related to the modifications and applications are included in the scope of the present invention, which is disclosed in the accompanying claims.

INDUSTRIAL APPLICABILITY

The method according to the present invention relates to a method of updating a plurality of sensor nodes which constitutes a wireless sensor network or a ubiquitous sensor network, and can be widely used in a wireless sensor network field, or a ubiquitous sensor network field, which includes the plurality of sensor nodes, which are scattered in various areas.

The invention claimed is:

1. A method for updating firmware of a plurality of nodes constituting a wireless sensor network, including a server, a gateway and the plurality of nodes, the method comprising:

transmitting firmware to be updated from the server through the gateway to an uppermost node;

sequentially transmitting the firmware to the plurality of nodes from the uppermost node to a lowermost node using wireless communication, and the respective nodes, which have received the firmware, recording the firmware in their own memory; and recording the firmware, stored in the memory, in program memory, by running boot programs of the respective nodes when the recording of the firmware is completed in all the nodes, and then constituting a new network with peripheral nodes by executing the firmware recorded in the nodes, wherein the server acquires and stores depth information of the lowermost node before transmitting the firmware to be updated, acquires depth information of the lowermost node of the network newly constructed after update of the firmware is completed in all the nodes, compares the depth information of the lowermost node, which is acquired before the update, with the depth information of the lowermost node, which is acquired after the update, and verifies that the update is completed if the depth information, which is acquired before the update, is identical to the depth information, which is obtained after the update, wherein the plurality of nodes are linearly connected from the uppermost node to the lowermost node, wherein each of the nodes which constitutes the wireless sensor network has a transmission interval, a reception interval and a sleeping interval so as to transmit and receive data; and wherein an upper node transmits a data packet, providing notification of transmission of the firmware, during the transmission interval thereof, and a lower node receives the firmware from the upper node during the sleeping interval thereof when the data packet, providing notification of transmission of the firmware, is received from the upper node during the reception interval of the lower node.

2. The method according to claim 1, wherein each of the boot programs boots each of the nodes by sequentially performing:

(a) if an update_flag is set to 'True', reading firmware previously stored in the memory and recording it in the program memory;

(b) if the update_flag is not set to 'True' and connection to an external firmware downloader is made, receiving firmware from the firmware downloader, and recording the received firmware in the program memory; and (c) executing an application program of the firmware recorded in the program memory.

* * * * *